United States Patent
Wang

[11] Patent Number: 6,041,488
[45] Date of Patent: Mar. 28, 2000

[54] SEMI-AUTOMATED MEDIA REWORK PROCESS

[75] Inventor: Keng Meng Albert Wang, Singapore, Singapore

[73] Assignee: Seagate Technology, Inc., Scotts Valley, Calif.

[21] Appl. No.: 09/293,218

[22] Filed: Apr. 16, 1999

Related U.S. Application Data

[60] Provisional application No. 60/082,231, Apr. 16, 1998.

[51] Int. Cl.[7] ...................................................... G11B 5/42
[52] U.S. Cl. ..................................... 29/603.03; 29/402.08
[58] Field of Search ........................... 29/603.03, 402.08; 360/98.08, 98.01

[56] References Cited

U.S. PATENT DOCUMENTS

| | | | |
|---|---|---|---|
| 5,136,450 | 8/1992 | Moir | 360/135 |
| 5,333,080 | 7/1994 | Ridinger et al. | 360/99.12 |
| 5,615,067 | 3/1997 | Jabbari et al. | 360/98.08 |
| 5,781,374 | 7/1998 | Moir et al. | 360/99.12 |
| 5,880,905 | 3/1999 | Kazmierczak et al. | 360/98.08 |

*Primary Examiner*—Carl E. Hall
*Attorney, Agent, or Firm*—John B. Phillips

[57] ABSTRACT

A media rework tool includes a gripper assembly having a plurality of opposing arms for grasping predetermined discs within a disc pack. The gripper assembly raises the predetermined discs and any intermediate spacer rings upward for temporary storage on a media guide to allow the remainder of the disc pack to be reworked, such as for replacement of a defective disc or spindle motor. A method of reworking a disc pack includes centering the disc pack between opposing arms of a gripper assembly and beneath a cylindrical media guide. A plurality of the opposing arms close to grasp a predetermined number of discs, and the gripper assembly is raised to transfer the grasped discs, and any intermediate spacer rings, from the spindle motor to the media guide. Following reworking of the remainder of the disc pack, the spindle motor is returned to its centered position relative to the media guide and the gripper assembly. The gripper assembly is then lowered to restack the discs and spacer rings on the spindle motor and the opposing arms are opened to release the discs.

18 Claims, 17 Drawing Sheets

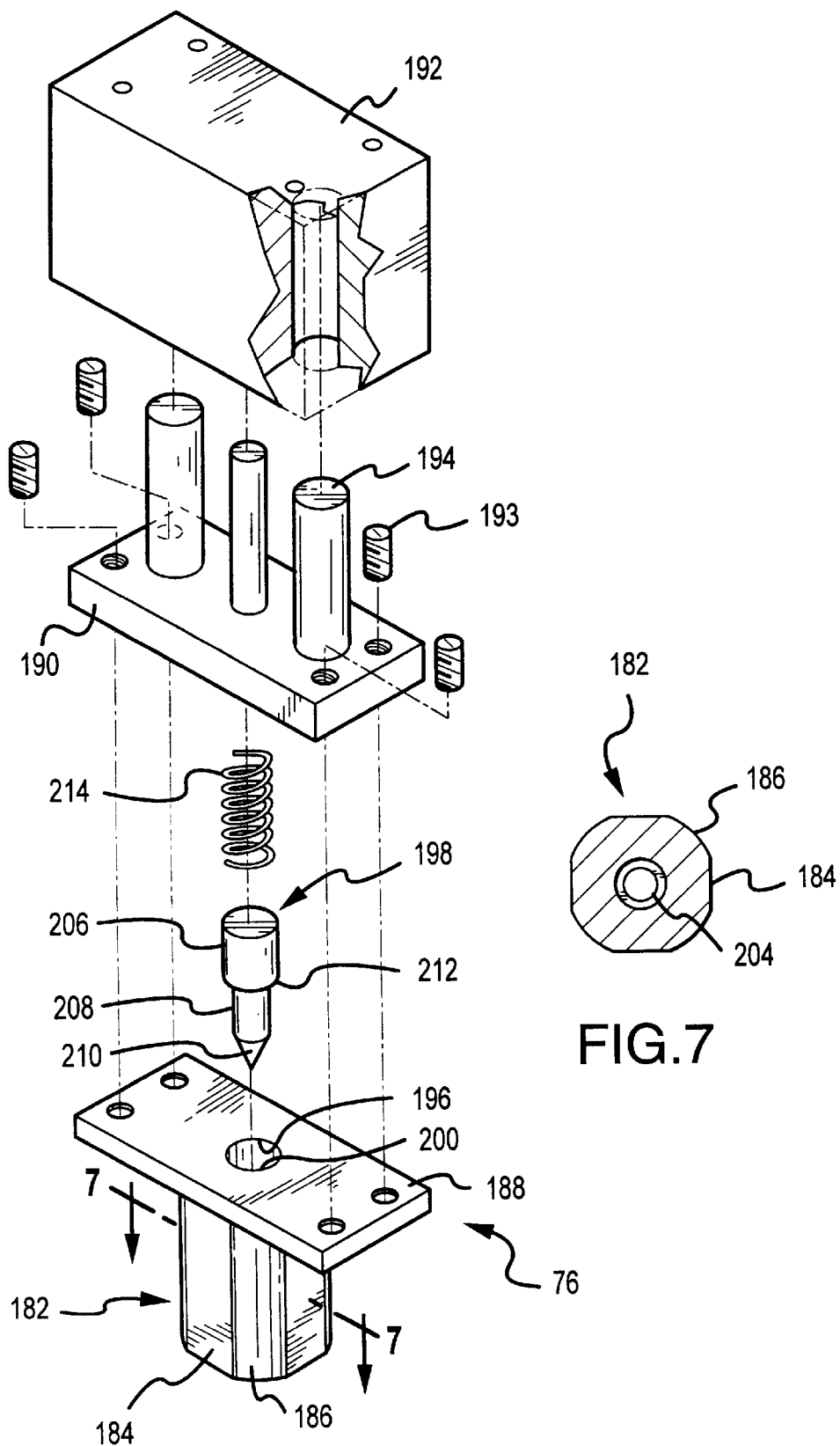

SEMI-AUTOMATED MEDIA REWORK PROCESS

RELATED APPLICATIONS

The present application claims the benefit of U.S. Provisional application Ser. No. 60/082,231 entitled SEMI-AUTOMATED MEDIA REWORK TOOL, filed Apr. 16, 1998.

FIELD OF THE INVENTION

The present invention relates to tools for assembling disc drives. More particularly, the resent invention relates to a semi-automated tool and process that reduces the time required to first remove and then replace a stack of discs onto a spindle motor of a disc drive.

BACKGROUND OF THE INVENTION

Disc drives are used to record and reproduce information stored on recording "media" or discs. Conventional disc drives employ a plurality of vertically-arrayed discs, each disc having a top and bottom surface with a magnetic coating for storing data. The discs are spaced from one another by a distance sufficient to allow magnetic read/write heads to pass over both the top and bottom surfaces of adjacent discs.

The vertical array or "stack" of discs are typically journaled about the cylindrical hub of a spindle motor which is mounted on a fixed shaft for high speed rotation within the disc drive housing. The disc stack includes a bottom disc supported by a lower flange of the spindle motor hub. A series of additional discs and spacer rings are then stacked on top of the bottom disc in an alternating pattern. Once the disc stack and spindle motor have been assembled into a "disc pack," a clamp ring is fitted over both the top of the spindle motor hub and the top disc of the disc stack to secure the discs and the spacer rings to the hub. Following assembly, the disc pack is spin balanced and counterweights are applied as necessary to reduce any wobble or run-out due to imbalance or an offset center of gravity. In light of recent increases in track density on current generations of disc drives, even small degrees of disc wobble can lead to tracking errors.

Thus, each disc pack is typically required to pass a number of diagnostic and spin balancing tests before installation within a disc drive. However, if the disc pack fails any of the tests, it is typically sent for "reworking." For example, if a diagnostic shows that one or more of the discs are defective, the entire disc pack must be reworked to replace the defective disc. Likewise, reworking is required if the spindle motor is found to be defective or if the imbalance of the disc pack is too large to be cured by counter eights. It is common for approximately 10–15% of disc packs on a production line to require reworking.

Reworking a disc pack requires that each of the discs and the spacer rings be removed one at a time and stacked in inverse order on a rack. Even if only one of the discs is found to be defective (e.g., the second disc from the top of the stack), it is typically required that all of the discs and spacer rings be removed and then restacked on the spindle motor hub to ensure that the discs are properly centered and balanced after reworking. Indeed, a shim is typically applied to the empty motor hub prior to restacking the discs to aid in centering the discs and spacer rings about the motor hub, thereby maintaining the concentricity of the discs and reducing run-out errors. However, the process of manually transferring each disc and spacer ring from the spindle motor to a stand, and then transferring all of the discs and spacer rings back to the spindle motor requires a great deal of time and operator skill to prevent damaging the fragile discs during the reworking process. However, even with skilled operators, the manual handling of each disc within the disc pack will inevitably damage a number of discs. Furthermore, although the disc drive assembly line is located within a clean room facility, the time-consuming rework process increases the chances that the discs will be exposed to contaminants that will adversely affect the performance of the disc drive.

It is with respect to these and other background considerations, limitations and problems that the present invention has evolved.

SUMMARY OF THE INVENTION

The present invention provides apparatus and a process for reworking a disc pack having a spindle motor and a plurality of discs separated by spacer rings. Reworking of a disc pack is typically required to replace a defective disc or spindle motor or to simply restack the discs on the spindle motor to improve the concentricity or balance of the disc pack.

In accordance with a preferred embodiment of the present invention, a media rework tool includes a base and a slider plate connected to move laterally along the base. A chuck attached to the slider plate is adapted to secure the spindle motor so that the disc pack moves with the slider plate. The slider plate moves the disc pack between a retracted position (for loading and unloading the disc pack and for changing defective discs or spindle motors) and an extended position where the disc pack engages both a gripper assembly and a media guide. The media guide is substantially cylindrical in shape and extends vertically downward in alignment with the spindle motor when the slider plate is in the extended position. The gripper assembly includes a plurality of opposing arms operated in pairs to selectively grasp individual discs within the disc pack. The gripper assembly is connected to move vertically relative to the base to transfer one or more discs held by the opposing arms (together with any intermediate spacer rings) to the media guide to allow the remainder of the disc pack to be retracted with the slider plate for reworking (such as for replacement of a defective disc or motor). The gripper assembly also acts to restack the discs and the spacer rings on the spindle motor before opening the opposing arms and releasing the discs.

In accordance with a further preferred embodiment of the present invention, a method of reworking a disc pack includes centering the disc pack on a media rework tool between opposing arms of a gripper assembly and beneath a vertically-oriented, cylindrical media guide. A plurality of the opposing arms close to grasp a predetermined number of the discs, the predetermined number being one or all of the discs in the disc pack or any number in between. The gripper assembly is then raised to transfer the predetermined number of discs, and any intermediate spacer rings, from the spindle motor to the media guide. If a defective disc is being replaced, the predetermined number of discs raised by the gripper assembly will leave the defective disc exposed at the top of the remaining disc stack so that an operator may replace the defective disc. Alternatively, if the spindle motor itself is to be replaced, or if a complete restacking of the disc pack is otherwise required, then the predetermined number includes all of the discs. Once the defective disc or spindle motor has been replaced, the spindle motor is again centered under the media guide and between the opposing arms of the gripper assembly. The gripper assembly is then lowered from the media guide to restack the discs and spacer rings on the spindle motor. The opposing arms are then opened to release the discs and complete the reworking process.

These and various other features as well as advantages which characterize the present invention will be apparent from a reading of the following detailed description and a review of the associated drawings.

BRIEF DESCRIPTION OF THE DRAWINGS

FIG. 6 is an enlarged exploded view of the media guide illustrated in FIG. 1.

FIG. 7 is a section view taken substantially along the line 7—7 in FIG. 6.

DETAILED DESCRIPTION

Figure 1:
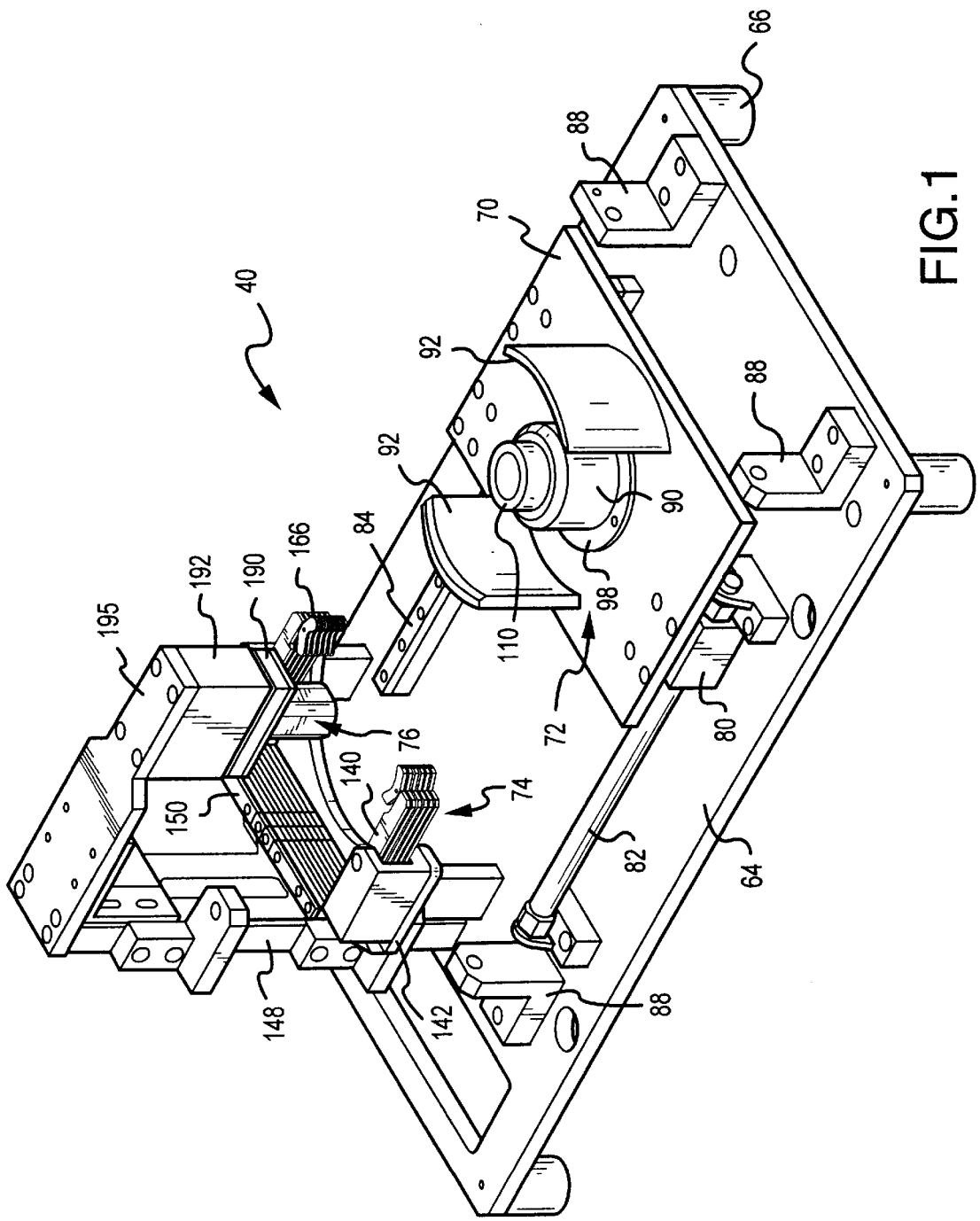
FIG. 1 is a perspective view of the semi-automated rework tool in accordance with a preferred embodiment of the present invention illustrating a slider plate, a gripper assembly and a media guide.

FIG. 1 illustrates an isometric view of one preferred embodiment of the semi-automated rework tool 40 of the present invention. The tool 40 is preferably used to rework a disc pack 42 (FIG. 2) in a manner described below. The tool 40 shown in FIG. 1 represents a preferred embodiment for use with the specific disc pack shown in FIG. 2. Specifically, the drawings illustrate an embodiment of the tool 40 for use with the disc pack 42 having a predetermined spindle motor 44 and six discs 46 of predetermined diameter and thickness, the discs 46 being separated a predetermined distance by spacer rings 48. However, alternative embodiments of the tool 40 may be constructed by one skilled in the art to accommodate disc packs having a different number of discs as well as disc packs having discs of different size, thickness or spacing between the discs. Indeed, as explained below, the time savings which can be achieved by using the tool 40 to rework a disc pack increases with the number of discs contained on the disc pack. Thus, it is understood that the present detailed description of one embodiment of the tool 40 does not limit the scope of the invention to use with disc packs having only six discs 46 or which utilize the specific spindle motor 44 shown in the drawings.

Figure 2:
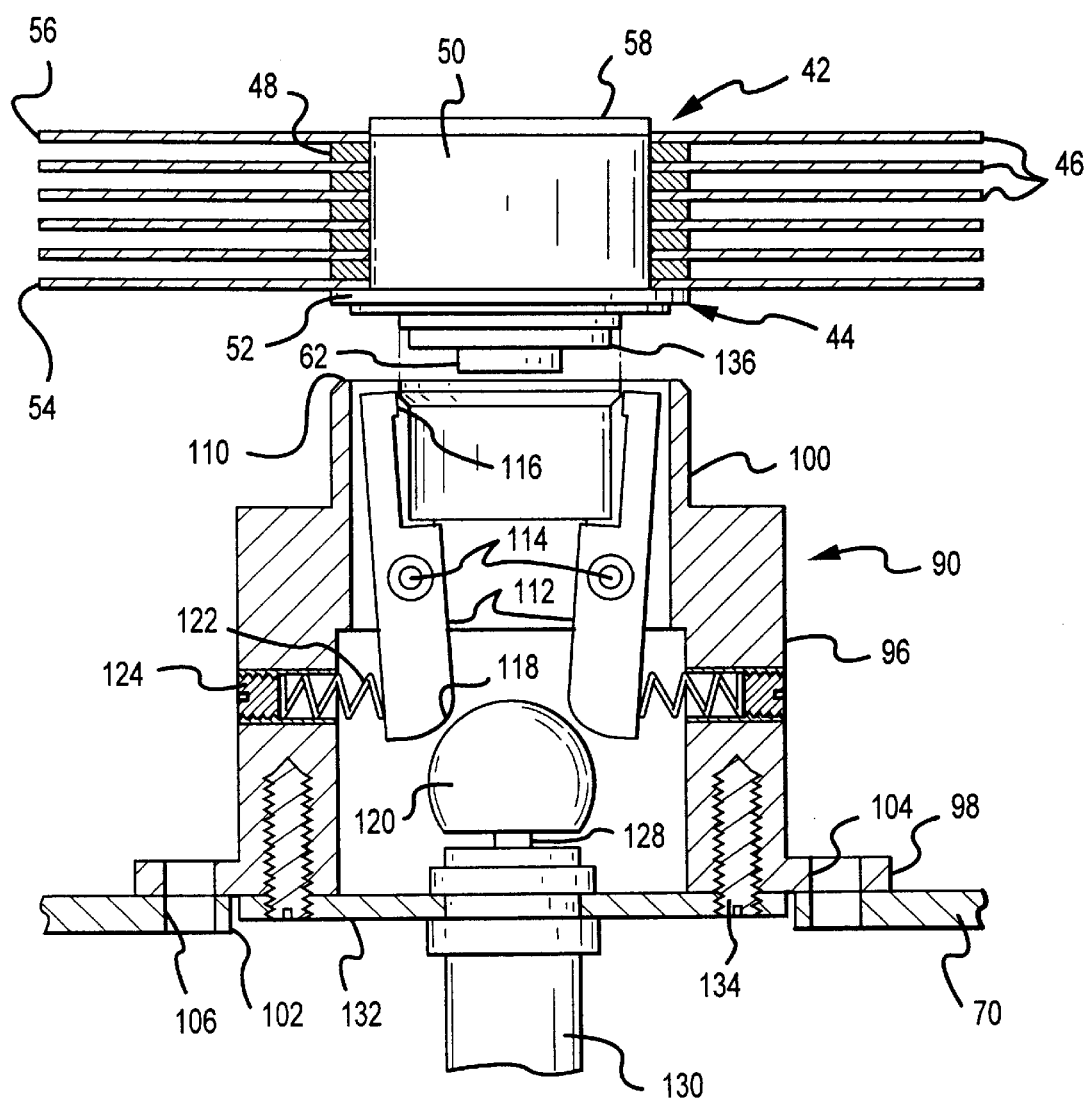
FIG. 2 an elevated view of a disc pack and a chuck for receiving and grasping the disc pack, whereby both the disc pack and the chuck are partially sectioned to illustrate internal details of these components.

FIG. 2 illustrates the disc pack 42 by sectioning the discs 46 and spacer rings 48 to better illustrate the exterior of the spindle motor 44. The spindle motor 44 preferably includes a cylindrical hub 50 and a lower annular flange 52 which protrudes radially outward from the cylindrical hub 50 to provide a support surface for the bottom disc 54. The disc pack 42 further comprises a plurality of spacer rings 48 and discs 46 (five are shown in the embodiment of FIG. 2) stacked alternately so that a top disc 56 is positioned adjacent a top end 58 of the motor hub 50. Prior to assembly within a disc drive, a clamp ring (not shown) is typically placed over an inner portion of the top disc 56 and secured to the top end 58 of the hub 50 to provide a clamping force to secure the discs 46 and spacer rings 48 to the hub 50. The spindle motor 44 also includes a shaft 62 which extends longitudinally through the hub 50 to provide for rotation of the motor 44 within the disc drive (not shown).

Once a disc pack 42 is determined to have a defect (e.g., a defective disc 46, a defective motor 44, or an excessive imbalance), the disc pack 42 is sent for reworking on the tool 40 shown in FIG. 1. The tool 40 includes a rectangular base plate 64 supported at its corners by four feet 66. The plate 64 is preferably made from aluminum for ease of manufacturing, although alternative materials may also be used. The base plate 64 provides a base for the primary components of the tool 40. Specifically, a slider plate 70 and attached nest 72 move along the base plate 64 between a retracted position for loading and unloading the disc pack 42 (FIG. 10), and an extended position for unloading and restacking the discs 46 on the spindle motor 44 (FIG. 11). A gripper assembly 74 (FIG. 4) acts to grip a predetermined number of discs 46 once the slider plate 70 and disc pack 42 reach the extended position. Once the discs 46 have been grasped, the gripper assembly 74 is raised upward to remove the discs 46 from the spindle motor 44 and allow the slider plate 70 and the remainder of the disc pack 42 to be retracted (FIGS. 14 and 17), such as for replacement of a defective disc 46 or motor 44. The gripper assembly 74 preferably raises the discs upward and over a media guide 76 (FIG. 13) to help maintain the concentric position of the spacer rings 48 between the discs 46 until the discs 46 and the spacer rings 48 are restacked on the spindle motor 44. Each of the above primary components of the tool 40 will be described in greater detail below, together with a preferred process for using the tool 40 to rework a disc pack 42.

FIG. 1 illustrates that the one side of the slider plate 70 is fastened to a carriage 80 of a pneumatic rodless cylinder 82, while the opposite side of the slider plate 70 is fastened to a guide (not shown) which supports the slider plate 70 for movement along a guide bar 84. Thus, the rodless cylinder 82 and guide bar 84 act in a conventional manner to move the slider plate 70 between a retracted position (FIG. 1) and an extended position (FIG. 11). Brackets 88 are positioned at each end of the base plate 64 to limit and/or monitor the travel of the slider plate 70. For example, shock absorbers (not shown) and proximity sensors (not shown) are preferably attached to one or more of the brackets 88 to help control the movement of the slider plate 70 between the extended and retracted positions and to properly center the nest 72 within the gripper assembly 74.

FIG. 1 further illustrates that the nest 72 includes a chuck 90 fastened to the center of the slider plate 70 in addition to two opposing curved guides 92 fixed to the slider plate 70 on opposite sides of the nest chuck 90. The nest chuck 90 serves to hold the disc pack 42 in a fixed position during the reworking process, while the guides 92 aid in centering the disc pack 42 when an operator loads the disc pack 42 into the nest chuck 90, as described below.

FIG. 2 illustrates an elevated view of the nest chuck 90 attached to the slider plate 70, with portions of the nest chuck 90 sectioned to better illustrate the interior components of the chuck 90. The chuck 90 preferably comprises a cylindrical body 96 having a bottom flange 98 protruding radially outward from the body 96 and a cylindrical upper portion 100 of reduced diameter in relation to the body 96. The slider plate 70 preferably includes a circular opening 102 of substantially the same diameter as that of the body 96 of the chuck 90. A plurality of holes 104 in the flange 98 align with holes 106 in the slider plate 70 arranged about the circumference of the opening 102 to allow fasteners (not shown) to secure the chuck 90 over the opening 102 in the slider plate 70.

The upper portion 100 of the nest chuck 90 includes an annular contact surface 110 for supporting a bottom surface of the spindle motor 44 when the disc pack 42 is inserted within the chuck 90. The interior of the upper portion 100 is further tapered as shown in FIG. 2 to receive a protruding end of the spindle motor shaft 62. The interior of the chuck 90 further includes a pair of opposing jaws 112 mounted to pivot about pins 114 which extend through the body 96 of the chuck 90. Each jaw 112 includes an upper contact surface 116 for gripping the spindle motor 44 and a lower curved end 118 for bearing against the curved surface of a cam 120. A pair of springs 122 extend through opposing openings 124 in the body 96 of the chuck 90 to contact a each of the jaws 112 at a point below their respective pivot pins 114. In this manner, the springs 122 apply a torque to the jaws which tends to open the jaws 112 as shown in FIG. 2. Set screws 124 are positioned behind the springs 122 to preset the spring force applied to the jaws 112.

Figure 3:
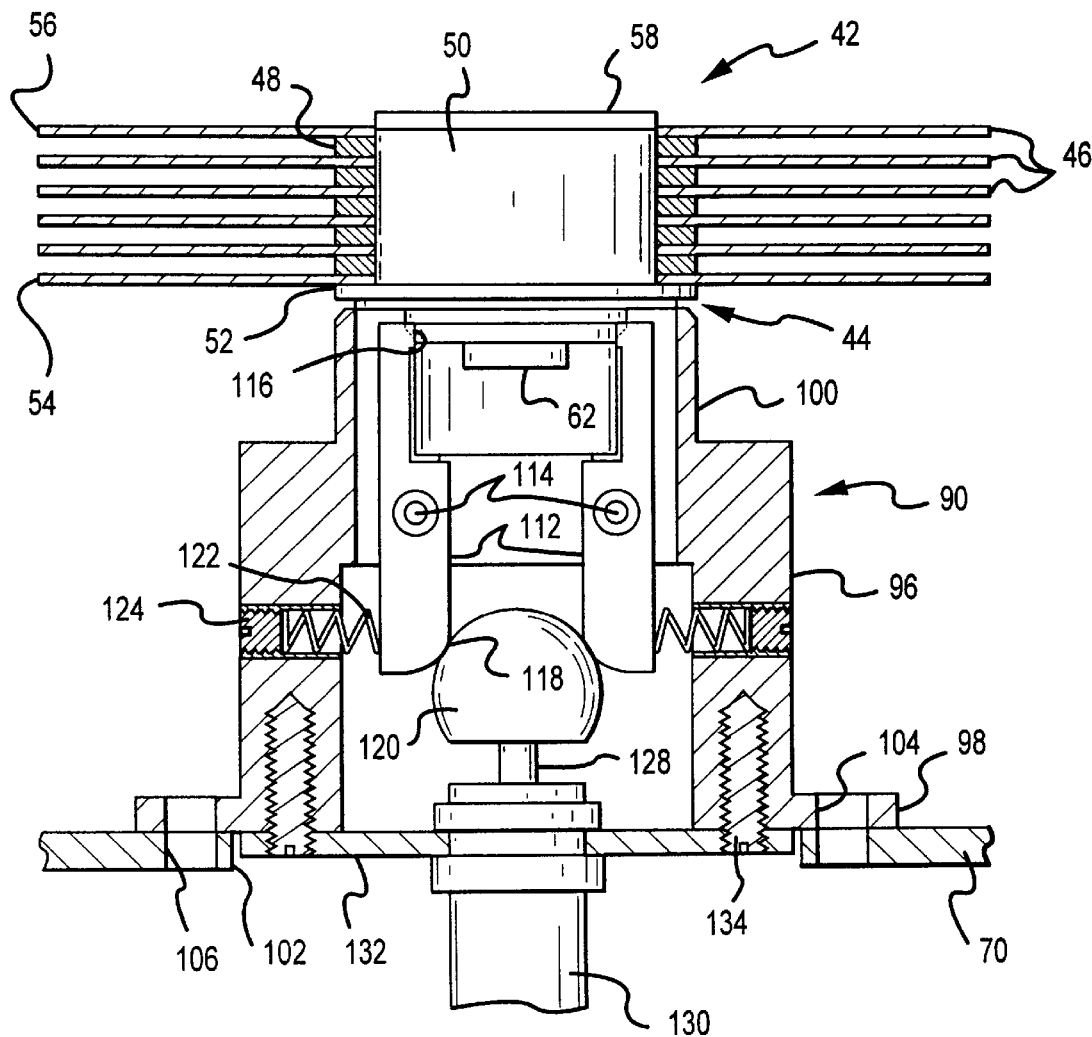
FIG. 3 is an elevated, partially sectioned view similar to FIG. 2, illustrating the disc pack grasped by the chuck.

The cam 120 is preferably connected to a piston rod 128 of a pneumatic cylinder 130, as shown in FIGS. 2 and 3. The cylinder 130 is held in place by a circular mounting plate 132 which is connected to the bottom of the chuck 90 by fasteners 134. The pneumatic cylinder 130 thus extends beneath the slider plate 70 where it connects to an air hose (not shown). The cylinder 130 is preferably a single-action, spring return cylinder whereby a spring within the cylinder 130 normally holds the piston rod 128 and cam 120 in a retracted position as shown in FIG. 2. However, once the cylinder 130 is activated (FIG. 3), the cam 120 extends upward to contact the curved ends 118 of the jaws 112 and close the jaws 112 against the force of the springs 122.

Thus, the process of loading the disc pack 42 within the nest 72 begins with placing the slider plate 70 in the retracted position shown in FIG. 1. An operator then manually lowers the disc pack 42 into the nest 72, using the guides 92 to visually center the spindle motor 44 over the chuck 90, until the bottom of the spindle motor 44 rests upon the annular contact surface 110 of the chuck 90 and the spindle motor shaft 62 extends within the interior of the chuck 90. Once the motor 44 is properly seated, the operator activates the cylinder 130 to close the jaws 112 so that the upper contact surfaces 116 of the jaws securely engage opposite sides of a ring 136 (FIGS. 2 and 3) or other contact surface on the shaft 62. In this manner, the chuck 90 securely holds the spindle motor 44 within the nest 72 until the operator deactivates the cylinder 130 and opens the jaws 112.

Although the chuck 90 preferably utilizes a pair of mechanical jaws 112 to grasp the spindle motor 44, those skilled in the art will recognized alternative means for securing the motor 44 (and thus the disc pack 42) for movement on the slider plate 70. In one alternative embodiment (not shown), the interior of the chuck 90 is connected to a vacuum source and a continuous suction is applied to the bottom of the spindle motor 44 to maintain the motor 44 seated within the chuck 90 during the rework process. The present invention is not limited to the details of the nest 72 or the chuck 90 and is intended to cover all means for securing the disc pack 42 and moving the disc pack 42 between a retracted position and an extended position for manipulation by the gripper assembly 74.

Figure 4:
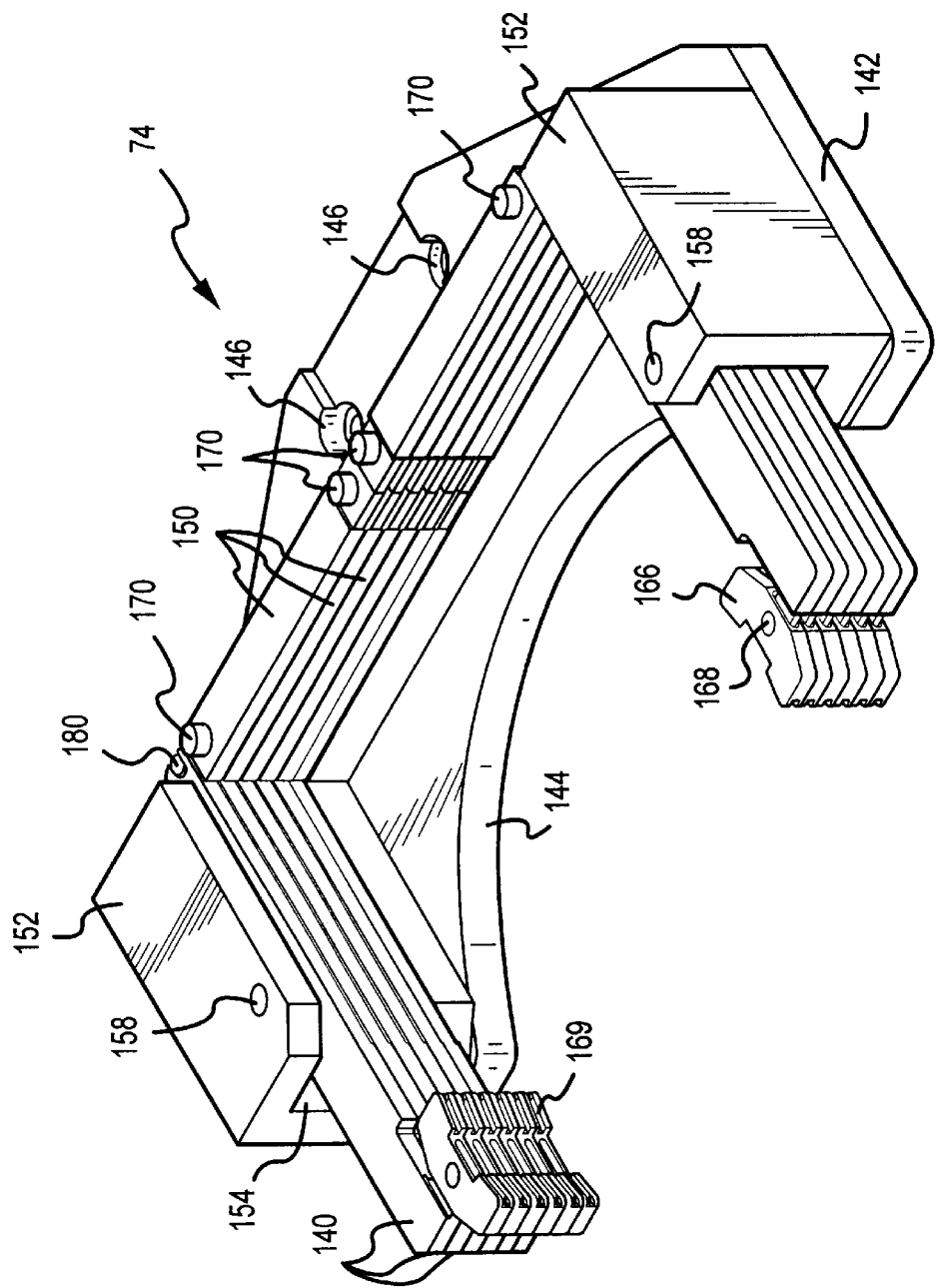
FIG. 4 is an enlarged perspective view of the gripper arm assembly illustrated in FIG. 1.

Once the disc pack 42 is secured to the chuck 90, the slider plate 70 moves the disc pack 42 into position between opposite sides of the gripper assembly 74. FIG. 4 illustrates that the gripper assembly 74 preferably includes six pairs of opposing clamp arms 140 pivotably attached to a support plate 142. The support plate 142 includes a curved portion 144 to prevent interference with the guide 92 and the discs 46 once the slider plate 70 has been extended as shown in FIG. 11. A rear portion of the support plate 142 includes two holes 146 for attachment to a conventional slide table (not shown) which in turn is mounted to slide up and down along a vertical post 148 (FIG. 1) attached to the base plate 64. The slide table (not shown) is preferably connected to a pneumatic cylinder (not shown) to allow controlled vertical movement of the slide table, and thus of the support plate 142 and the gripper assembly 74, along the vertical post 148.

Figure 5:
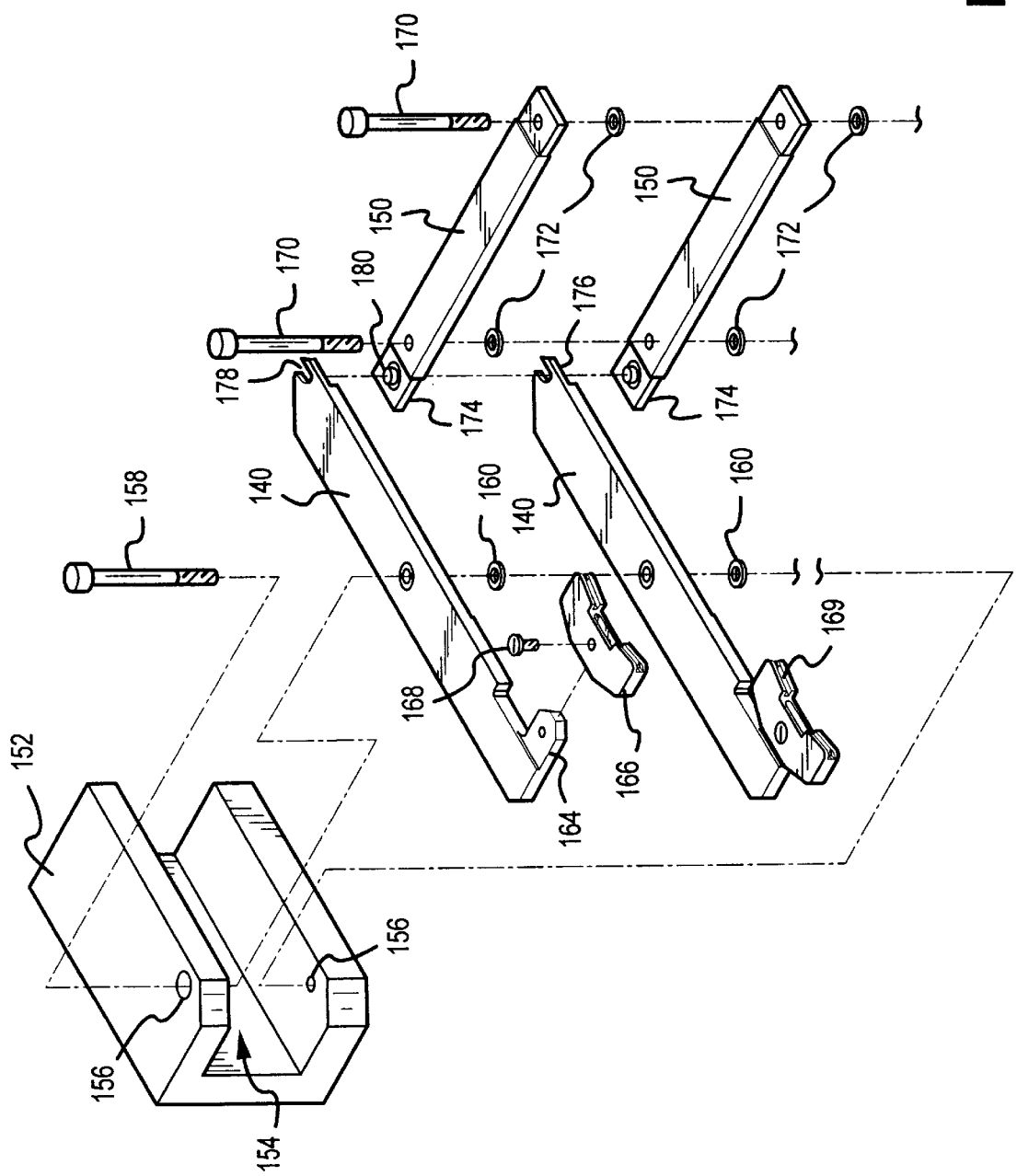
FIG. 5 is an exploded view of a portion of the gripper arm assembly illustrated in FIG. 4.

FIG. 5 details the operation of the gripper assembly 74 by illustrating an exploded view of two of the clamp arms 140 and their respective cylinders 150. A channel block 152 positioned on either end of the support plate 142 (FIG. 4) includes a channel 154 for receiving a stack of the clamp arms 140, in addition to top and bottom openings 156 for receiving a pivot pin 158. In the preferred embodiment of the tool 40 (adapted for gripping a maximum of six discs 46), six clamp arms 140 are stacked together with washers 160 separating adjacent clamp arms 140 The washers 160 provide the necessary spacing between the clamp arms 140 for gripping the discs 46 (i.e., spacing equal to the thickness of the spacer rings 48 of the disc pack 42). Thus, each clamp arm 140 is free to pivot independently about the pivot pin 158.

FIG. 5 further illustrates that one end of the clamp arm 140 includes a protruding tab 164 for connection to a clamp 166. A pivot pin 168 connects the clamp 166 to the tab 164 to allow for a pivoting motion of the clamp 166 relative to the arm 140. Each clamp 166 also includes a groove 169 for receiving the edge of a disc 46 when the clamp arms 140 are pivoted to a closed position around the disc 46. Furthermore, the pivoting motion of the clamp 166 about the pin 168 ensures that the edge of the disc 46 will seat completely within the groove 169.

An end of each clamp arm 140 is connected to a cylinder 150 as shown in FIGS. 4 and 5. The stack of cylinders 150 are secured to the gripper assembly support plate 142 by screws 170. Washers 172 (FIG. 5) serve to provide the proper spacing between the cylinders 150 in each stack. The rectangular cylinders 150 are preferably of the type manufactured by Festo Pneumatic under the model number EZH-1.5/6.5–10. Each cylinder 150 includes a rectangular piston rod 174 which is held in a retracted position by a return spring and which may be extended by the application of air to a port (not shown) on the cylinder 150. The rectangular piston rod 174 preferably mates with an undercut end 176 (FIG. 5) of the clamp arm 140 opposite the clamp 166. The undercut end 176 includes a U-shaped slot 178 for receiving a cylindrical pin 180 on the end of the rectangular piston rod 174. The cylindrical pin 180 is preferably press fit within an opening formed in the end of the piston rod 174, and the U-shaped slot 178 allows for limited movement of the pin 180 within the slot 178 as the piston rod 174 alternately extends and retracts and the undercut end 176 moves along an arcuate path.

Thus, FIG. 4 illustrates the twelve clamp arms 140 and twelve cylinders 150 of the gripper assembly 74 in a retracted or open position. The use of the individual cylinders 150 allows an operator to close only selected ones of the clamp arms 140 to grip selected discs 46 of the disc pack 42. For example, energizing only the top cylinders 150 of each cylinder stack would cause only the top pair of clamp arms 140 to close and grasp the top disc 56 of the disc pack 42. Once gripped in this manner, the gripper assembly support plate 142 may be lifted by moving the slide table (not shown) along the vertical post 148 as described above, thereby lifting the top disc 56 off of the spindle motor 44. Once the top disc 56 has been removed, the slider plate 70 and the remainder of the disc pack 42 may be retracted to allow an operator to change the second disc without requiring that the operator first manually unstack the top disc 56. Once the second disc had been changed, the disc pack 42 is returned to position beneath the gripper assembly 74, and the gripper assembly 74 is lowered to return the top disc 56 to its position atop the disc stack 42. The top pair of cylinders 150 are then de-energized to allow the return springs within the cylinders 150 to retract the piston rods 174 and open the clamp arms 140. The restacked disc pack 42 is then retracted with the slider plate 70 and removed from the chuck 90 for further processing and assembly within a disc drive (not shown).

In those cases where more than just the top disc 56 of the disc pack 42 must be unstacked to provide access to the defective disc, the gripper assembly 74 preferably raises the plurality of discs 46 and their intermediate spacer rings 48 over a media guide 76 to prevent inadvertent movement of the spacer rings 48 relative to the discs 46 (i.e., to maintain the concentric relative positions of the discs 46 and the annular spacer rings 48). The media guide 76 preferably comprises a cylindrical body 182 of substantially the same diameter as the spindle motor hub 50 to provide a temporary centering guide for the discs 46 and spacer rings 48 of the disc pack 42. In one preferred embodiment, the media guide 76 includes a plurality of flat surfaces 184 spaced about the circumference of the body 182 (FIGS. 6 and 7) to minimize contact with the discs 46 and the spacer rings 48 while still providing sufficient contact area along the remaining surfaces 186 to maintain the concentric position of the discs and spacer rings 48. In this manner, the media guide 76 may be manufactured with slightly larger tolerances than would otherwise be required for a truly cylindrical guide 76.

The media guide 76 also preferably includes a rectangular plate 188 secured to the end of the body 182, as best shown in FIG. 6. The rectangular plate 188 is preferably attached to a rectangular ram 190 of a pneumatic cylinder 192 by fasteners 193. Piston rods 194 connect the ram 190 to the cylinder 192. The pneumatic cylinder 192 is preferably of the type manufactured by SMC under the model number MGQM 12. A top surface of the cylinder 192 is then fastened to an arm 195 (FIG. 1) which extends laterally from the top of the vertical post 148 (FIG. 1) to suspend the cylinder 192 and the attached media guide 76 over the gripper assembly 74. In this manner, the ram 190 of the cylinder 192 may be extended to lower the media guide and retracted to raise the media guide 76, as described below.

Figure 8:
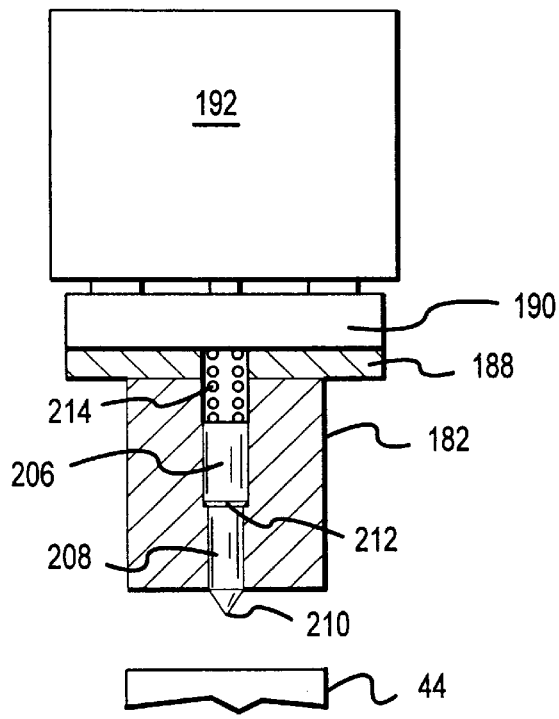
FIG. 8 is a partially sectioned side elevation of the media guide shown in FIG. 6, whereby the media guide is illustrated in a retracted position relative to a spindle motor of the disc pack shown in FIG. 2.
Figure 9:
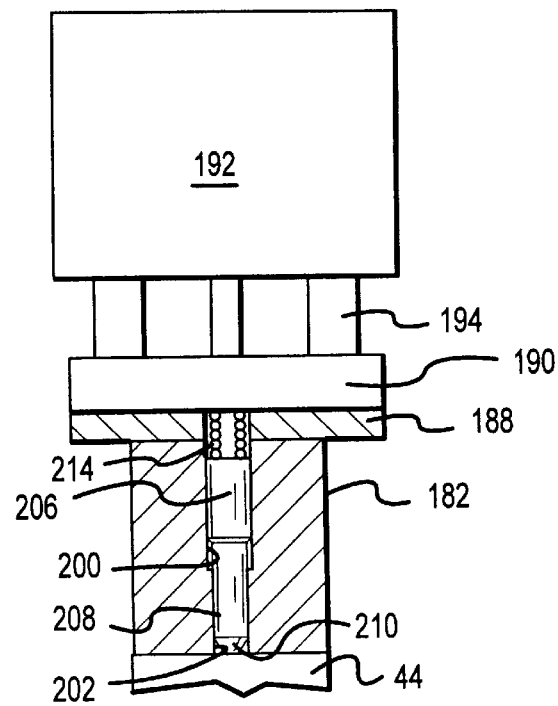
FIG. 9 is a partially sectioned side elevation of the media guide similar to FIG. 8, whereby the media guide is illustrated in an extended position relative to the spindle motor of the disc pack.

While the media guide 76 may comprise a solid member in one embodiment of the present invention, a preferred embodiment of the media guide 76 includes a tapered cylindrical channel 196 (FIGS. 6–9) for insertion of a plunger 198. The tapered channel includes a relatively wide upper portion 200 (FIG. 9) and a relatively narrow lower portion 202 with an annular rim 204 (FIG. 7) defined between the portions 200 and 202. The plunger 198 also includes a relatively wide upper portion 206 and a relatively narrow lower portion 208 which terminates in a pointed tip 210. The upper and lower portions 206 and 208, respectively, of the plunger 198 are joined by a tapered annular flange 212 which engages the annular rim 204 to support the plunger 198 within the tapered channel 196 of the media guide 76. A spring 214 is preferably inserted in the upper portion 200 of the channel 196 above the plunger 198 prior to assembling the rectangular plate 188 of the media guide 76 to the ram 190 of the cylinder 192 (FIG. 6) as described above. The spring 214 is initially compressed only a small degree to ensure that the flange 212 of the plunger 198 is seated against the annular rim 204 and to ensure that the tip 210 of the plunger 198 protrudes from the bottom of the media guide 76, as shown in FIG. 8. However, when the media guide 76 is lowered toward the spindle motor 44 (FIG. 9) for transfer of the discs 46 from the disc pack 42 to the body 182 of the media guide 76, the pointed tip 210 of the plunger 198 preferably seats within an opening 216 (FIG. 10) in the top of the spindle motor 44, as demonstrated in FIG. 9. Because the opening 216 is centered on the top of the spindle motor 44, the tip 210 further helps to align the media guide 76 with the cylindrical motor hub 50. Furthermore, as the tip 210 engages the opening 216, the plunger 198 moves upward against the force of the spring 214 to prevent damaging the motor 44, as shown in FIG. 9. In one preferred embodiment, a bottom surface of the media guide 76 does not contact the top of the motor 44. Rather, a gap of approximately 0.20 millimeters remains between the bottom surface of the guide 76 and the upper surface of the motor 44.

The above description is understood to particularly describe only one preferred embodiment of the tool 40 and does not limit the tool 40 to the disclosed embodiments of the primary components. For example, one skilled in the art could use alternate means for extending and retracting the disc pack 42, actuating the clamp arms 140, or aligning the media guide 76 with the motor 44. It is further understood that one skilled in the art may practice the process of the present invention, as described below, by utilizing alternative embodiments of the above components.

FIGS. 10–19 disclose different steps of one preferred process of reworking a disc pack 42 to change a defective disc 46. Specifically, FIGS. 10–19 illustrate the process of changing the third disc of a six-disc pack 42. However, as described below, a similar process may be followed to change a defective motor 44 or to rebalance a stack of discs 46 on the motor 44.

Figure 10:
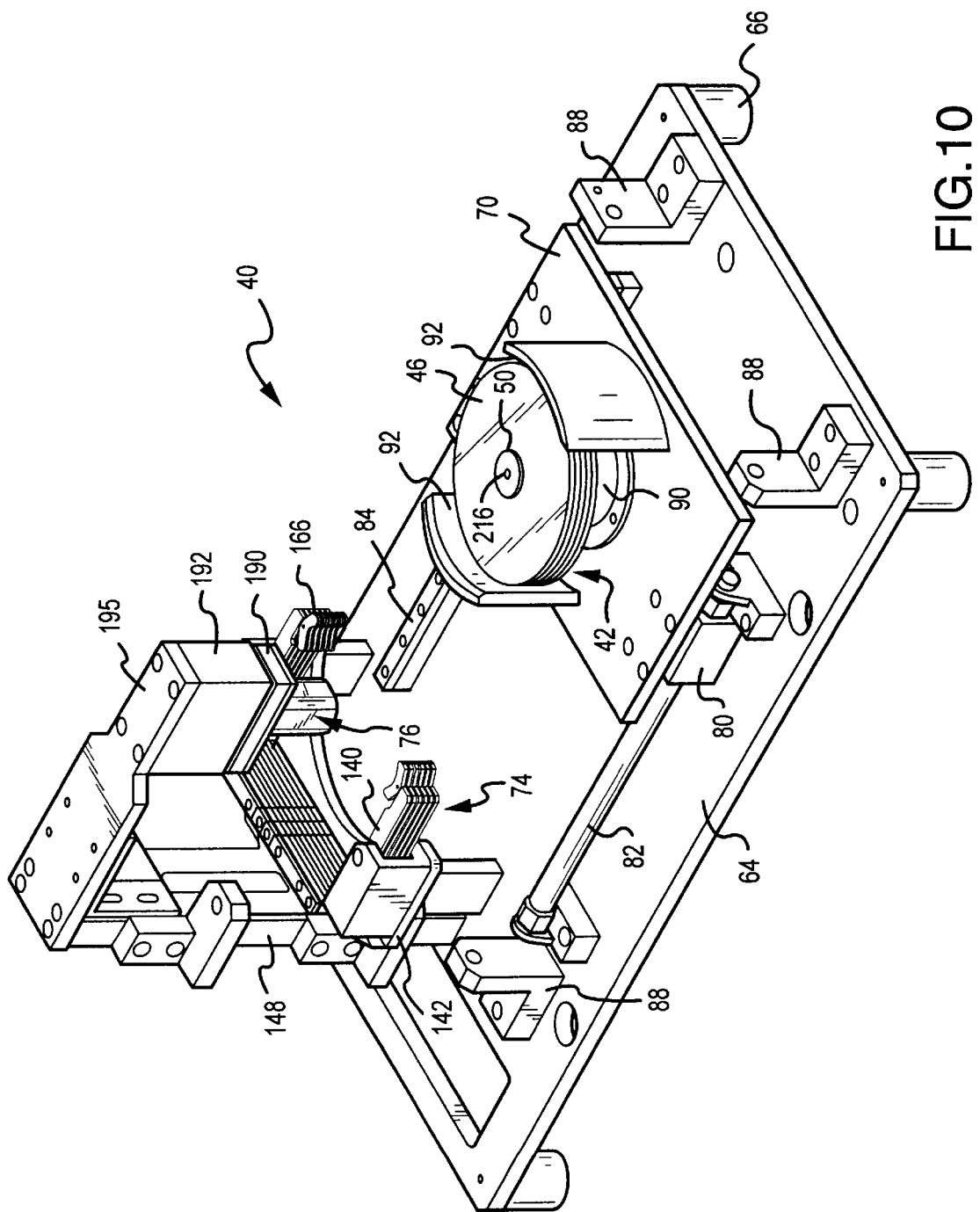
FIG. 10 is a perspective view similar to FIG. 1 illustrating an initial step of a restacking process in accordance with a preferred embodiment of the present invention whereby the disc pack shown in FIG. 2 is received within the chuck atop the slider plate.
Figure 11:
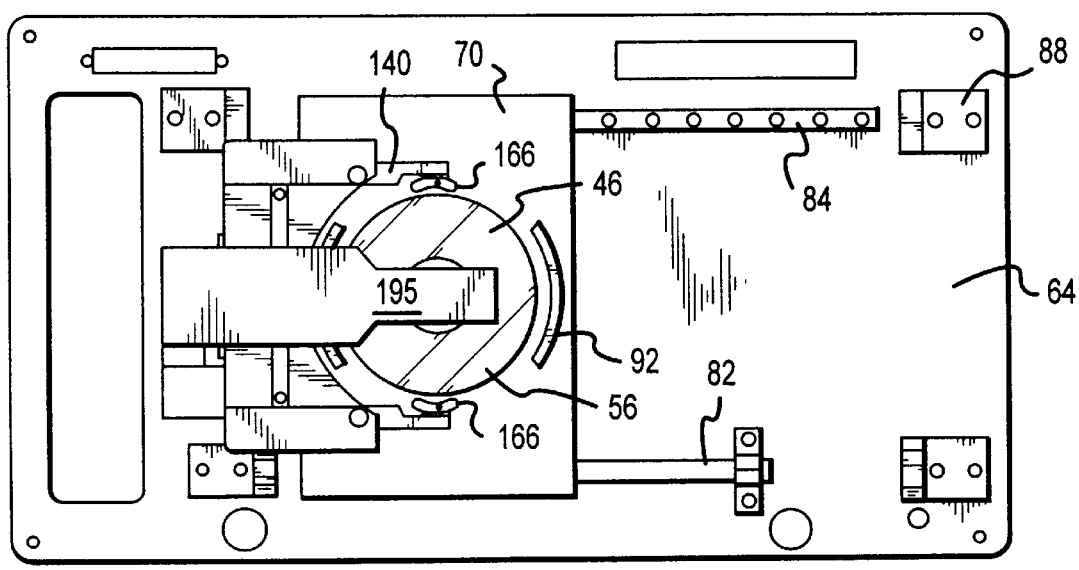
FIG. 11 is a top view of the tool shown in FIG. 10 illustrating the slider plate and disc pack extended into position relative to the gripper assembly and media guide.

FIG. 10 is similar to FIG. 1 but further illustrates the first step in reworking a disc pack 42. That is, the disc pack 42 has been manually inserted into the nest 72 by an operator who preferably uses the guides 92 on the slider plate 70 to visually center the disc pack 42 between the guides 92. Once the operator has placed the bottom surface of the spindle motor 44 on the contact surface 110 of the chuck 90, the operator activates the cylinder 130 to pivot the jaws 112 and grasp the shaft 62 or other contact surface on the motor 44 as described above. Once the disc pack 42 is secured within the nest 72, the operator activates the slider plate 70 to position the disc pack between the clamp arms 140 of the gripper assembly as shown in FIG. 11.

Figure 12:
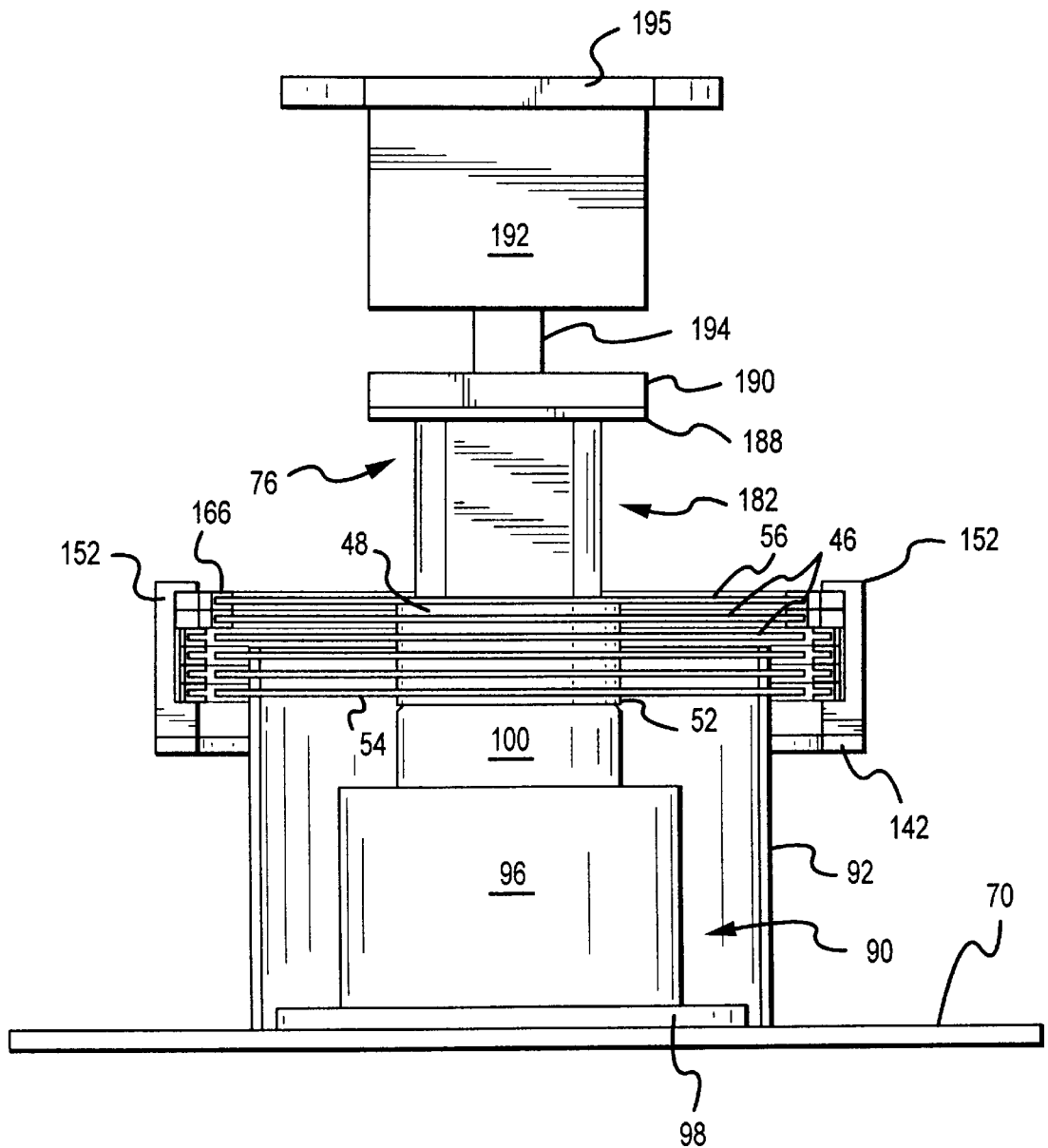
FIG. 12 is a front elevated view of the tool shown in FIG. 10 illustrating the media guide lowered to contact the disc pack and the gripper assembly grasping the top two discs of the disc pack.

Once the slider plate 70 has been extended as in FIG. 11, the operator selects which disc 46 is defective (i.e., which disc must be manually replaced). For the present example, it is assumed that the third disc 220 has been previously determined to be defective. Once this information has been entered into a control panel (not shown) for the tool 40, the gripper assembly 74 and the media guide 76 are activated as shown in FIG. 12 to grip the top two discs 46. In essence, the top two pairs of clamp arms 140 are pivoted by their respective cylinders 150 until the clamps 166 firmly engage the edges of the top two discs 46. FIG. 12 illustrates that the remaining four pairs of clamp arms 140 remain in their open position. Next, FIG. 12 illustrates that the media guide 76 lowers to engage the top of the spindle motor hub 50 in preparation for lifting the top two discs 46 off of the spindle motor 44. The media guide 76 is preferably lowered until the tip 210 of the plunger 198 fits within the opening 216, thereby leaving a slight gap of approximately 0.20 millimeters between the media guide 76 and the top of the motor 44 as described above.

Figure 13:
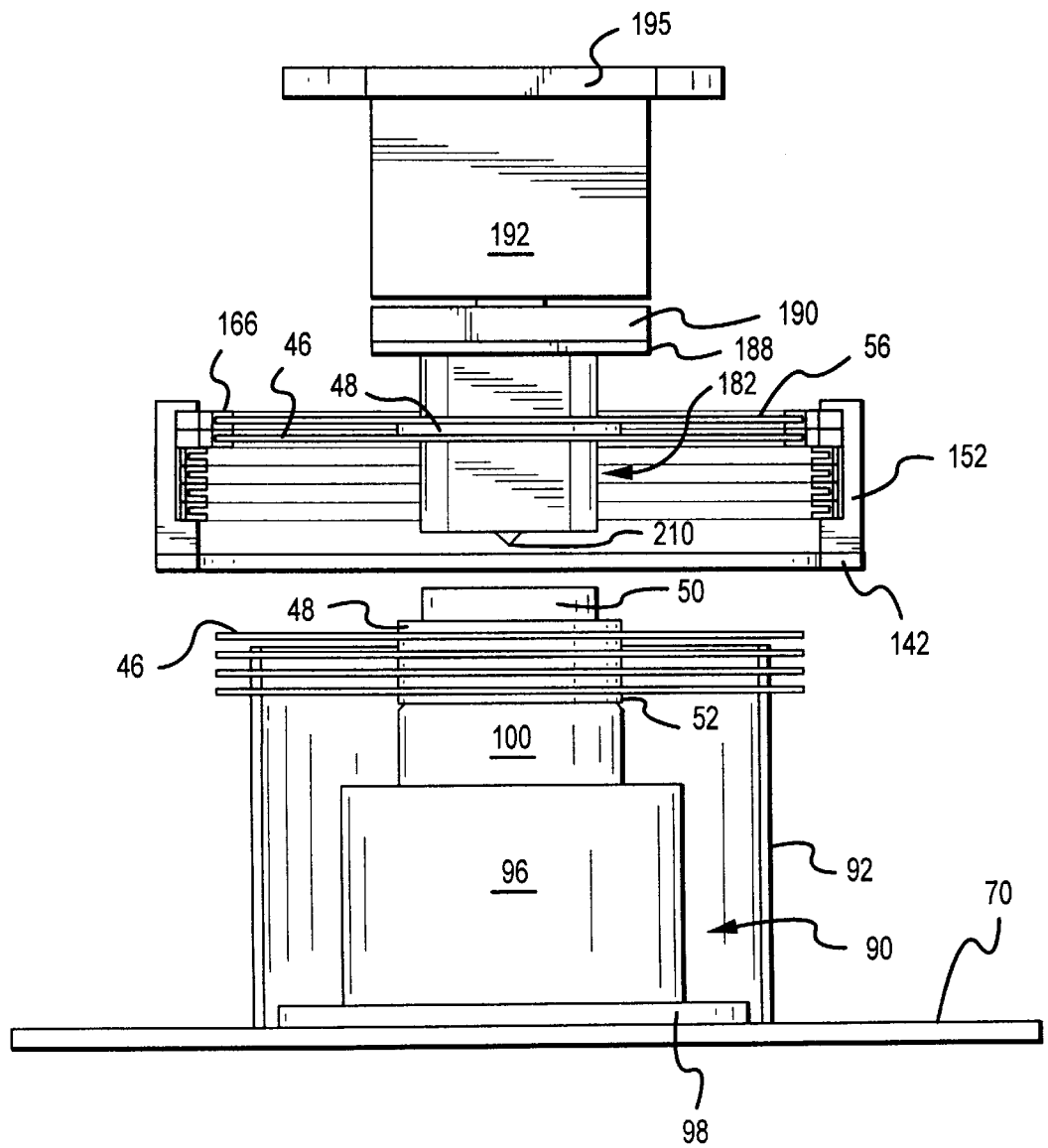
FIG. 13 is a front elevation view similar to FIG. 12 illustrating the gripper assembly and the media guide raised upward to remove the top two discs from the disc pack.

FIG. 13 illustrates the next steps of the process comprising raising the gripper assembly 74 and then the media guide 76 to expose the defective disc 220 and the spacer ring 222 which rests atop the defective disc 220. The gripper assembly 74 is raised by operating a pneumatic cylinder (not shown) to raise the slide table (not shown) attached to the support plate 142 of the gripper assembly 74, as described above. Once the top two discs 46 and their intermediate spacer ring 48 have been transferred from the motor hub 50 to the body 182 of the media guide 76, the media guide is preferably raised (i.e., the ram 190 is retracted) to allow the slider plate 70 and the remainder of the disc pack 42 to be retracted as shown in FIG. 14.

Figure 14:
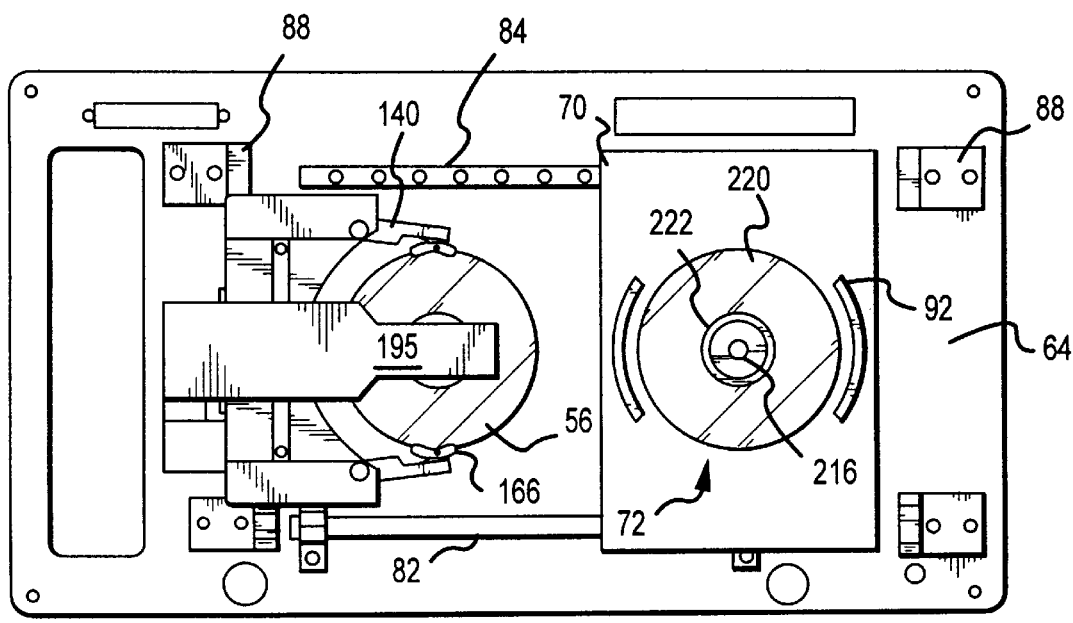
FIG. 14 is a top view similar to FIG. 11 illustrating the slider plate and the disc pack in a retracted position to allow manual replacement of a defective disc.

FIG. 14 thus illustrates both the two discs 46 retained by the gripper assembly 74 and the media guide 76, as well as the retracted disc pack 42 with the exposed defective disc 220 and the spacer ring 222 which had previously separated the second disc 46 from the third (defective) disc 220. Once the disc pack 42 is positioned as shown in FIG. 14, the operator must manually remove the spacer ring 222 and then the defective disc 220. Initially, the operator removes the spacer ring 222 and places the ring 222 on a separate rack (not shown) for later use. The operator next picks up and removes the defective disc 220 for later inspection or for use as scrap. The operator then retrieves a replacement disc 46 and manually installs the replacement disc 46 over the hub 50 until it rests upon the next spacer ring 48. Next, the operator retrieves the spacer ring 222 from the rack (not shown) and inserts it over top of the hub 50 until it rests upon the replacement disc 46. Once the defective disc 220 has been replaced, the bulk of the operator's manual work is completed and the slider plate 70 is again activated to return the disc pack 42 to a point below the gripper assembly 74 and the media guide 76.

Figure 15:
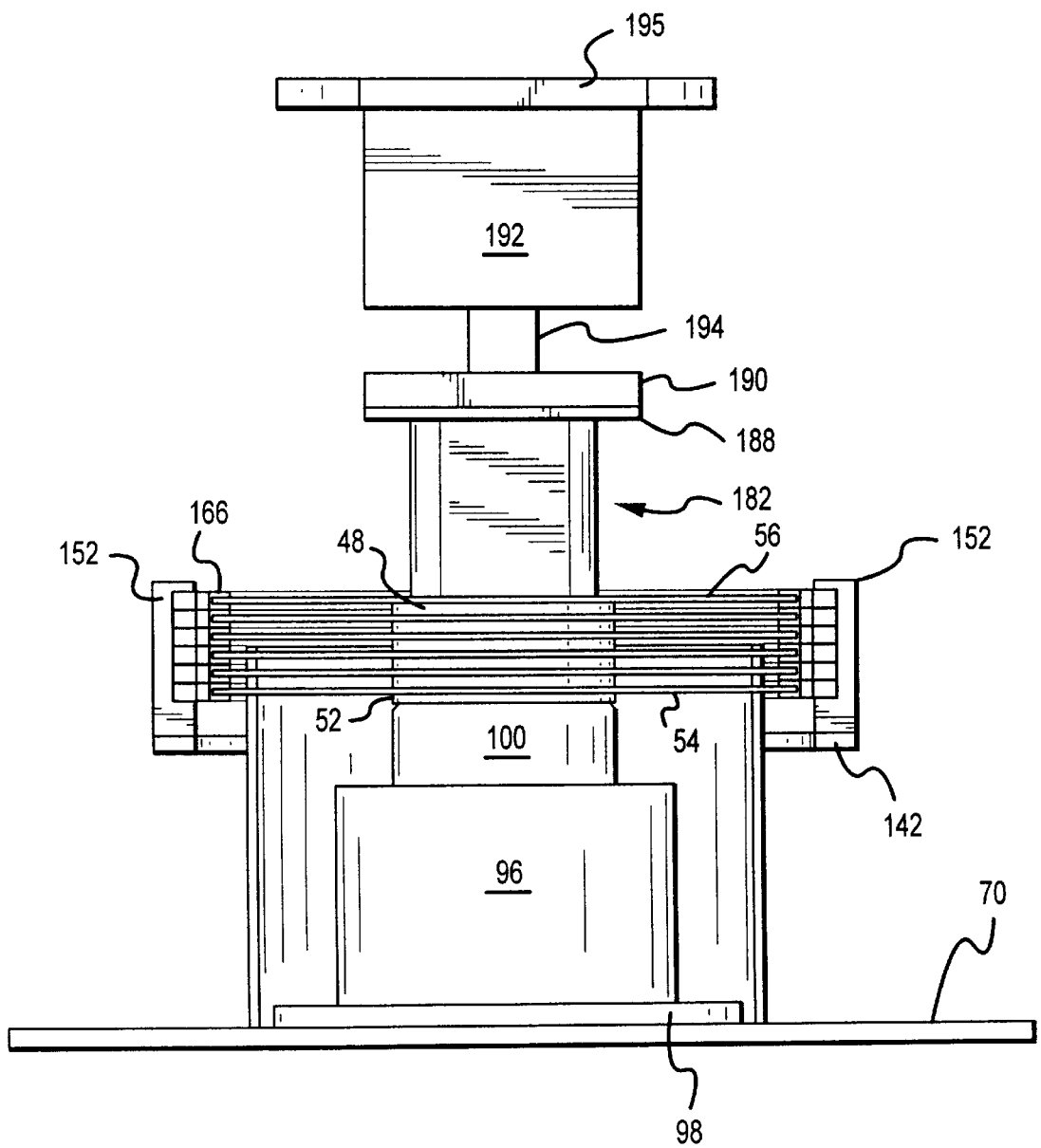
FIG. 15 is a front elevation view similar to FIG. 12 illustrating the media guide and the gripper assembly lowered to grasp all six discs of the disc pack.

At this point, the gripper assembly 74 and the media guide 76 may be lowered to return the top two discs 46 and the intermediate spacer ring 48 to the disc pack 42. The disc pack 42 could then be retracted with the slider plate 70 and returned to the production line for further testing and assembly within a disc drive. However, typical manufacturing procedures require that a reworked disc pack be completely restacked prior to returning the disc pack 42 to the production line. Additionally, it may be necessary to replace the spindle motor 44 itself. Thus, FIG. 15 illustrates the transfer of the top two discs 46 from the media guide 76 back to the motor hub 50 so that all six discs (including the replacement disc) are now contained on the hub 50. FIG. 15 further illustrates that all six discs 46 have been grasped by their respective pairs of clamp arms 140 in preparation for transferring all of the discs 46 to the media guide 76. Alternatively, FIG. 15 may be viewed as the first part of a process for exchanging a defective spindle motor 44 rather than replacing a single disc 46.

Figure 16:
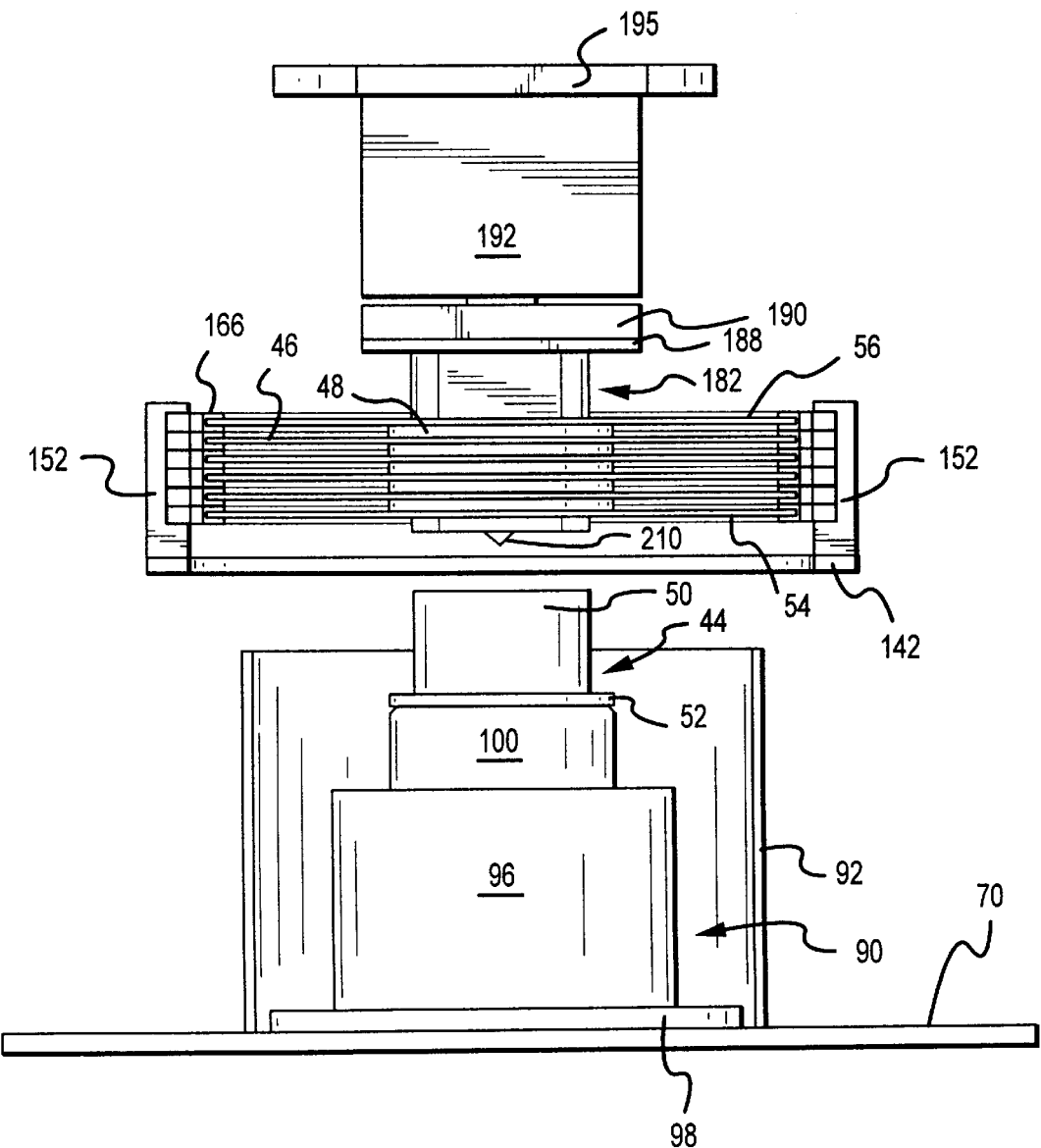
FIG. 16 is a front elevation view similar to FIG. 13 illustrating the gripper assembly and the media guide raised to remove all six discs from the spindle motor.

FIG. 16 next illustrates that all six discs 46 have been raised by the gripper assembly 74 to the media guide 76, and that the media guide 76 has been retracted (i.e., raised up) to allow retraction of the slider plate 70 and the attached spindle motor 44. Thus, FIG. 16 again represents two possible scenarios including the restacking of all the discs 46 following the replacement of a defective disc 220, or the unstacking of all the discs 46 to allow for replacement of a defective motor 44.

Figure 17:
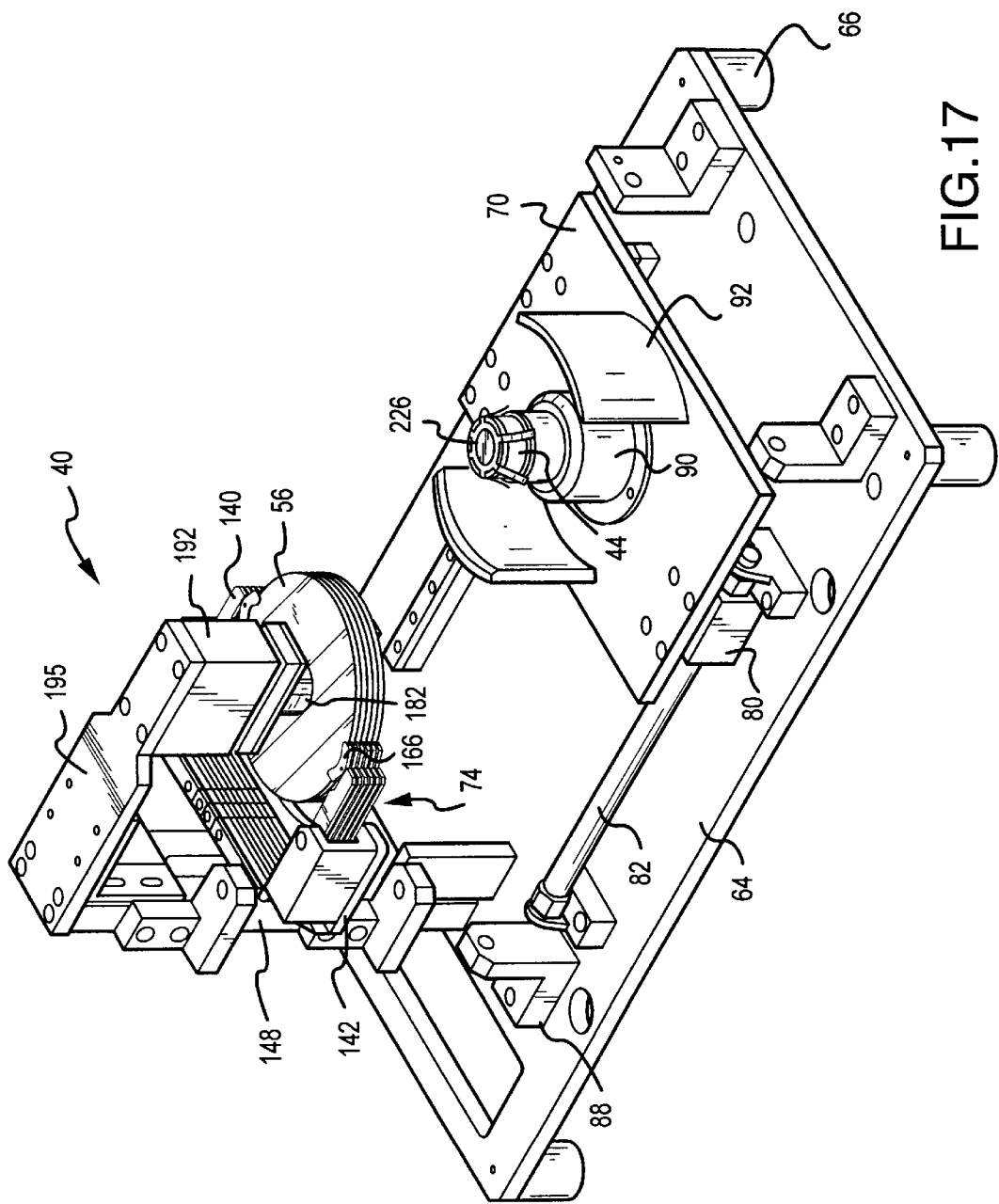
FIG. 17 is a perspective view similar to FIG. 10 illustrating the slider plate in a retracted position and the stack of discs held by the gripper assembly and the media guide to allow for replacement of the spindle motor and/or installation of a spider shim on the spindle motor.

FIG. 17 illustrates the entire stack of six discs 46 held by the gripper assembly 74 while the slider plate 70 and motor 44 are in a retracted position. If the motor 44 was previously shown to be defective, the operator would release the clamping mechanism within the chuck 90 (i.e., de-energize the cylinder 130) and replace the defective motor with a new motor 44 before re-energizing the cylinder 130 to secure the new motor 44. Next, regardless of whether the motor 44 is replaced, the operator preferably places a spider shim 226 over top of the motor 44 as shown in FIG. 17. The spider shim operates in a known manner to help center the discs about the motor hub 50, thereby maintaining the concentricity of the discs 46 and reducing run-out errors.

Figure 18:
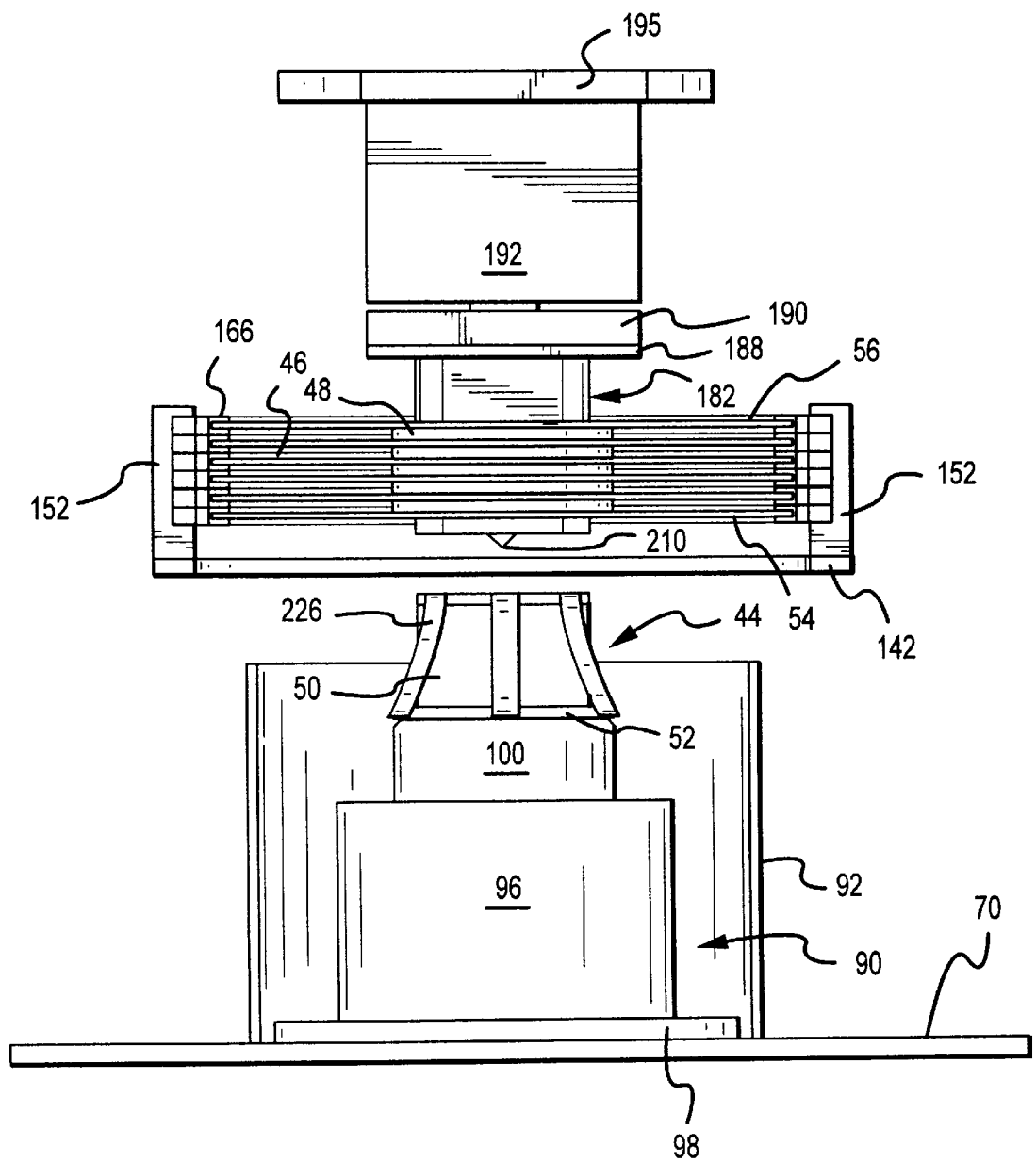
FIG. 18 is a front elevation view similar to FIG. 13 illustrating the slider plate and spindle motor extended into position below the gripper assembly and the media guide to receive the stack of discs.
Figure 19:
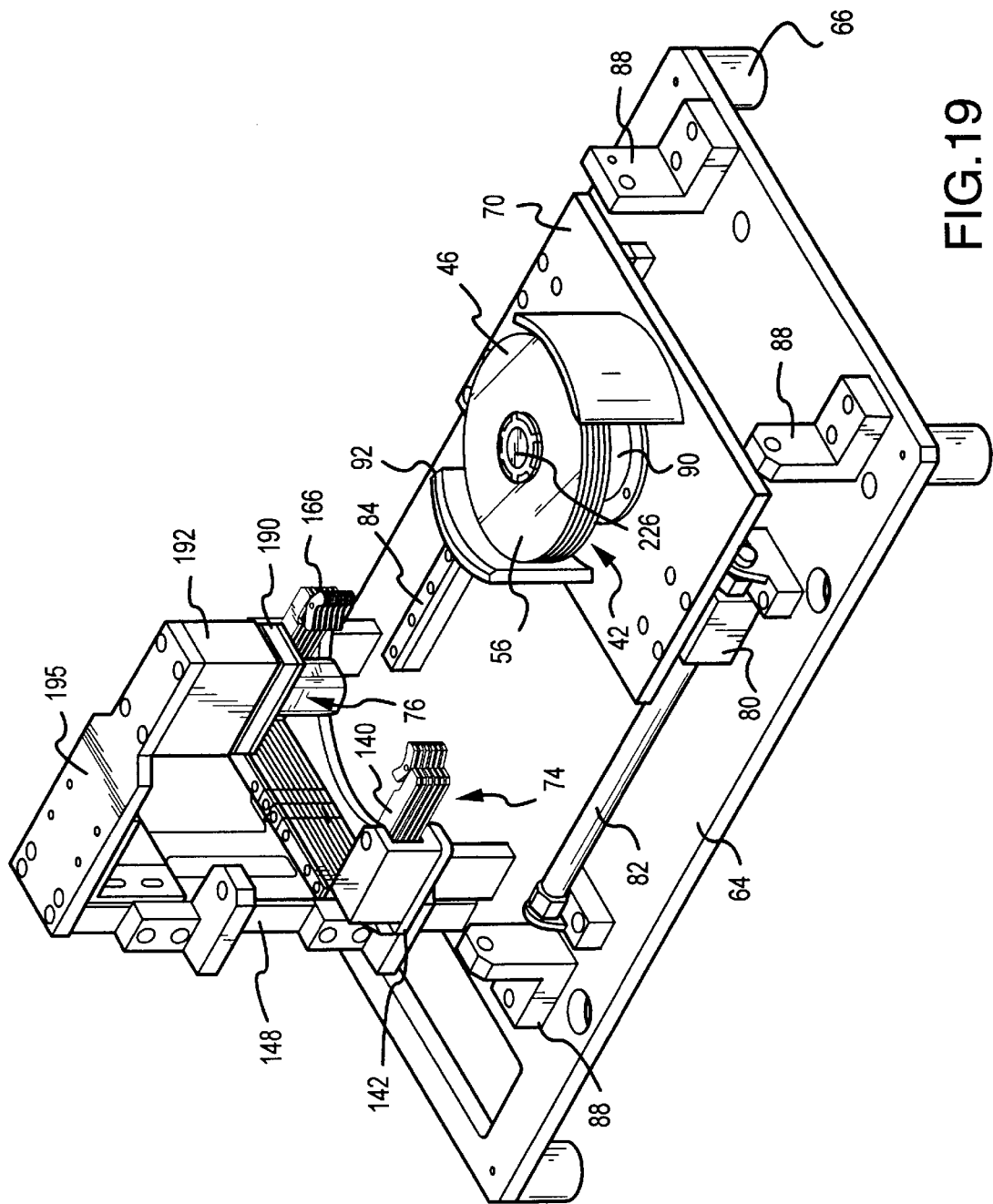
FIG. 19 is a perspective view similar to FIG. 17 illustrating the slider plate and the restacked disc pack retracted from the gripper assembly and the media guide.

FIG. 18 illustrates that the motor with the manually applied spider shim 226 is returned to the extended position below the gripper assembly 74 and the media guide 76. Next, the media guide 76 is lowered to engage the spider shim 226 and the gripper assembly 74 is then lowered to simultaneously restack all six discs 46 onto the motor hub 50. The slider plate 70 is then retracted with the newly restacked disc pack 42 and the attached spider shim 226 as shown in FIG. 19. The operator then manually removes the disc pack 42 from the nest chuck 90 and sends the disc pack for further testing and balancing, at which point the shim 226 is typically removed from the top of the motor 44.

Thus, the tool 40 automates a number of operations relating to replacing a defective disc and/or spindle motor. Specifically, much of the work and time required to change a defective disc pertains to first unstacking the non-defective discs and spacer rings which were stacked above the defective disc, and then restacking those discs and spacer rings once the defective disc has been replaced. For instance, if the bottom disc of the six-disc pack 42 was shown to be defective, an operator would typically be required to manually remove each of the five discs 46 and the five spacer rings 48 (one at a time) to reach the defective disc. Then, after replacing the defective disc, the operator would be required to restack the good discs 46 and spacer rings 48. Additionally, since most production line procedures require the restacking of all the discs of a pack 42 after any one disc is replaced, the operator would typically have to first unstack and then restack all of the discs 46 and the spacer rings 48 regardless of which disc had to be replaced. This time consuming process can prove costly, particularly when one considers that the process takes place in a clean room facility.

Furthermore, it is inevitable that even skilled operators will damage a number of the fragile discs 46 as the operators manually transfer the discs back and forth between the spindle motor 44 and a temporary storage rack (not shown). However, due to the alignment mechanisms utilized with the present tool 40, the number of discs 46 which are damaged during the reworking process of the present invention is dramatically reduced with respect to prior reworking processes.

For example, the inventor has found that use of the tool 40 improves the overall operation time for reworking a typical disc pack 42 by approximately fifty percent. Thus, fewer reworking stations and fewer reworking operators are required on the production line, thereby reducing both labor costs and costs associated with clean room space. Further, as noted above, the amount of damaged or scrap media is reduced due to the lower level of manual handling of the media Additionally, the above improvements in both time and cost to rework a disc pack 42 will typically increase with the size of the disc pack (i.e., with the number of discs contained in the pack 42). In essence, while the above description describes an embodiment of the tool 40 which accommodates six discs 46, alternative embodiments can accommodate larger numbers of discs by simply increasing the number of clamp arms 140 in the gripper assembly and the length of the media guide 76.

It is understood that the above-described process for restacking a disc pack 42 (FIGS. 10–19) is not limited to the previously described preferred embodiment of the tool 40. Rather, the process of the present invention may be utilized with alternative forms of the tool 40, as described above. Specifically, one skilled in the art may utilize alternative forms of the tool (e.g., an alternative gripper assembly 74, media guide 76 or slider plate 70) to achieve the same process described above. Thus, it is understood that the process of the present invention is intended to encompass any alternative tool which uses semi-automated components to automatically unstack one or more discs 46 from the pack 42, followed by an automatic restacking of the discs 46 and spacer rings 48 onto the spindle motor 44 once the defective disc and/or motor has been replaced.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method of reworking a disc pack comprising a spindle motor and a plurality of discs separated by spacer rings, the method comprising the steps of:

(a) centering the disc pack on a media rework tool between opposing arms of a gripper assembly;

(b) closing a top pair of the opposing arms to grasp a top disc of the disc pack;

(c) raising the gripper assembly to lift the top disc from the spindle motor and expose a spacer ring and a defective disc beneath the top disc;

(d) separating the disc pack from the gripper assembly;

(e) removing the exposed spacer ring from the spindle motor;

(f) removing the exposed defective disc from the spindle motor;

(g) placing a non-defective disc on the spindle motor in place of the defective disc;

(h) replacing the exposed spacer ring on the spindle motor atop the non-defective disc;

(i) centering the disc pack between the opposing arms of the gripper assembly;

(j) lowering the gripper assembly to restack the top disc on the spindle motor atop the exposed spacer ring; and (k) opening the top pair of opposing arms to release the top disc.

2. A method as recited in claim 1, wherein:

step (a) further comprises attaching the disc pack to a slider plate of the media rework tool and moving the slider plate to an extended position centered between the opposing arms of the gripper assembly;

step (d) further comprises moving the slider plate to a retracted position away from the gripper assembly; and step (i) further comprises moving the slider plate to the extended position.

3. A method as recited in claim 2, further comprising the steps of:

(l) moving the slider plate to the retracted position; and (m) detaching the disc pack from the slider plate.

4. A method as recited in claim 1, further comprising the steps of:

(l) closing the opposing arms to grasp all of the plurality of discs;

(m) positioning a bottom end of a media guide adjacent a top end of the spindle motor;

(n) raising the gripper assembly to transfer the plurality of discs and spacer rings from the spindle motor to the media guide;

(o) separating the spindle motor from the gripper assembly and the media guide;

(p) attaching a shim to the spindle motor;

(q) centering the spindle motor between the opposing arms of the gripper assembly and beneath the media guide;

(r) positioning the bottom end of the media guide adjacent the top end of the spindle motor;

(s) lowering the gripper assembly to restack the plurality of discs and spacer rings on the spindle motor; and (t) opening the opposing arms to release the plurality of discs.

5. A method as recited in claim 4 further comprising the step of:

(u) replacing the spindle motor with a new spindle motor subsequent to step (o) and prior to step (p).

6. A method of reworking a disc pack comprising a spindle motor and a plurality of discs separated by spacer rings, the method comprising the steps of:

(a) centering the disc pack on a media rework tool between opposing arms of a gripper assembly and beneath a substantially cylindrical media guide;

(b) closing two or more pairs of the opposing arms to grasp two or more adjacent discs above a defective disc;

(c) positioning a bottom end of the media guide adjacent a top end of the spindle motor;

(d) raising the gripper assembly to transfer the two or more discs and any intermediate spacer rings from the spindle motor to the media guide and expose an additional spacer ring atop the defective disc;

(e) separating the disc pack from the gripper assembly;

(f) removing the exposed spacer ring from the spindle motor;

(g) removing the defective disc from the spindle motor;

(h) placing a new disc on the spindle motor in place of the defective disc;

(i) replacing the exposed spacer ring on the spindle motor atop the new disc;

(j) centering the spindle motor between the opposing arms of the gripper assembly and beneath the media guide;

(k) positioning the bottom end of the media guide adjacent the top end of the spindle motor;

(l) lowering the gripper assembly to transfer the two or more discs and the intermediate spacer rings from the media guide to spindle motor atop the exposed spacer ring; and (m) opening the two or more pairs of opposing arms to release the two or more discs.

7. A method as recited in claim 6, wherein:

step (a) further comprises attaching the disc pack to a slider plate of the media rework tool and moving the slider plate to an extended position centered between the opposing arms of the gripper assembly and beneath the media guide;

step (e) further comprises moving the slider plate to a retracted position away from the gripper assembly; and step (j) further comprises moving the slider plate to the extended position.

8. A method as recited in claim 7, further comprising the steps of:

(n) moving the slider plate to the retracted position; and (o) detaching the disc pack from the slider plate.

9. A method as recited in claim 6, wherein the media guide is attached to a ram of a cylinder suspended above the disc pack, and wherein steps (c) and (k) further comprise extending the ram until the bottom end of the media guide contacts the spindle motor.

10. A method as recited in claim 9, wherein step (e) further comprises retracting the ram to raise the media guide.

11. A method as recited in claim 6 further comprising the steps of:

(n) closing the opposing arms to grasp all of the plurality of discs;

(o) positioning the bottom end of the media guide adjacent the top end of the spindle motor;

(p) raising the gripper assembly to transfer the plurality of discs and spacer rings from the spindle motor to the media guide;

(q) separating the spindle motor from the gripper assembly and the media guide;

(r) attaching a shim to the spindle motor;

(s) centering the spindle motor between the opposing arms of the gripper assembly and beneath the media guide;

(t) positioning the bottom end of the media guide adjacent the top end of the spindle motor;

(u) lowering the gripper assembly to restack the plurality of discs and spacer rings on the spindle motor; and (v) opening the opposing arms to release the plurality of discs.

12. A method as recited in claim 11 further comprising the step of:

(w) replacing the spindle motor with a new spindle motor subsequent to step (q) and prior to step (r).

13. A method of reworking a disc pack comprising a spindle motor and a plurality of discs separated by spacer rings, the method comprising the steps of:

(a) centering the disc pack on a media rework tool between opposing arms of a gripper assembly and beneath a substantially cylindrical media guide;

(b) closing the opposing arms to grasp all of the plurality of discs;

(c) positioning a bottom end of the media guide adjacent a top end of the spindle motor;

(d) raising the gripper assembly to transfer the plurality of discs and spacer rings from the spindle motor to the media guide;

(e) separating the spindle motor from the gripper assembly and the media guide;

(f) attaching a shim to the spindle motor;

(g) centering the spindle motor between the opposing arms of the gripper assembly and beneath the media guide;

(h) positioning the bottom end of the media guide adjacent the top end of the spindle motor;

(i) lowering the gripper assembly to restack the plurality of discs and spacer rings on the spindle motor; and (j) opening the opposing arms to release the plurality of discs.

14. A method as recited in claim 13, wherein:

step (a) further comprises attaching the disc pack to a slider plate of the media rework tool and moving the slider plate to an extended position centered between the opposing arms of the gripper assembly and beneath the media guide;

step (e) further comprises moving the slider plate to a retracted position away from the gripper assembly; and step (g) further comprises moving the slider plate to the extended position.

15. A method as recited in claim 14, further comprising the steps of:
(k) moving the slider plate to the retracted position; and
(l) detaching the disc pack from the slider plate.

16. A method as recited in claim 13, wherein the media guide is attached to a ram of a cylinder suspended above the disc pack, and wherein steps (c) and (h) further comprise extending the ram until the bottom end of the media guide contacts the spindle motor.

17. A method as recited in claim 16, wherein step (e) further comprises retracting the ram to raise the media guide prior.

18. A method as recited in claim 13 further comprising the step of:
(k) replacing the spindle motor with a new spindle motor subsequent to step (e) and prior to step (f).

* * * * *